(12) United States Patent
Wu

(10) Patent No.: US 12,417,316 B2
(45) Date of Patent: Sep. 16, 2025

(54) DIFFERENTIAL PRIVACY-BASED SERVICE ANALYSIS METHOD AND APPARATUS

(71) Applicant: Alipay (Hangzhou) Information Technology Co., Ltd., Hangzhou (CN)

(72) Inventor: Ruofan Wu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 169 days.

(21) Appl. No.: 18/282,983

(22) PCT Filed: Mar. 18, 2022

(86) PCT No.: PCT/CN2022/081641
§ 371 (c)(1),
(2) Date: Sep. 19, 2023

(87) PCT Pub. No.: WO2022/199473
PCT Pub. Date: Sep. 29, 2022

(65) Prior Publication Data
US 2024/0176909 A1    May 30, 2024

(30) Foreign Application Priority Data
Mar. 25, 2021   (CN) .......................... 202110322506.4

(51) Int. Cl.
G06F 21/62    (2013.01)
G06Q 40/12    (2023.01)

(52) U.S. Cl.
CPC ......... *G06F 21/6254* (2013.01); *G06Q 40/12* (2013.12)

(58) Field of Classification Search
None
See application file for complete search history.

(56) References Cited

U.S. PATENT DOCUMENTS 12,223,078 B2 *   2/2025   Wu ..................... G06F 21/6227

FOREIGN PATENT DOCUMENTS

CN    107871087 A    4/2018
CN    111177792 A    5/2020
(Continued)

OTHER PUBLICATIONS

The International Search Report and Written Opinion of the International Searching Authority for Intl. Application No. PCT/CN2022/081641 mailed on May 24, 2022.

*Primary Examiner* — Cai Y Chen
(74) *Attorney, Agent, or Firm* — Womble Bond Dickinson (US) LLP

(57) ABSTRACT

This specification provides differential privacy-based service analysis methods and apparatuses. According to the methods, the methods include at least one service analysis stage, and any service analysis stage includes at least one round of operations. An $n^{th}$ round of operations of the service analysis stage include the following steps: obtaining target data, where the target data are obtained by performing anonymization processing on to-be-processed data; performing predetermined service analysis on the target data; and if the service analysis succeeds, ending the service analysis stage; or if the service analysis fails, determining an $(n+1)^{th}$ round of privacy budget, and sending the $(n+1)^{th}$ round of privacy budget to the multiple user devices. As such, in a process of performing differential privacy processing on data, a privacy budget can be adaptively adjusted to enhance flexibility of a privacy protection process and improving availability of privacy protection data.

11 Claims, 4 Drawing Sheets

(56) References Cited

FOREIGN PATENT DOCUMENTS

| CN | 111414641 A | 7/2020 |
|---|---|---|
| CN | 112926090 A | 6/2021 |

* cited by examiner

DIFFERENTIAL PRIVACY-BASED SERVICE ANALYSIS METHOD AND APPARATUS

CROSS-REFERENCE TO RELATED APPLICATIONS

This application is a national phase entry of International Application No. PCT/CN2022/081641 filed on Mar. 18, 2022, which claims priority to Chinese Application No. 202110322506.4 filed on Mar. 25, 2021, the contents of which are incorporated herein by reference in their entirety.

TECHNICAL FIELD

One or more embodiments of this specification relate to the field of differential privacy technologies, and in particular, to differential privacy-based service analysis methods and apparatuses.

BACKGROUND

Big data technologies need to perform statistics collection and analysis on data generated by people in work and life. With continuous development of the big data technologies, various data of people are collected, and a privacy problem also emerges. Currently, a differential privacy-based method is usually used to perform privacy protection processing on data. However, because a privacy budget is often too small and privacy protection is often too strict, most valid information in the data is damaged. As a result, data obtained through differential privacy-based processing cannot be used for service analysis.

SUMMARY

To solve one of the above-mentioned technical problems, one or more embodiments of this specification provide differential privacy-based service analysis methods and apparatuses.

According to a first aspect, a differential privacy-based service analysis method is provided. The method includes at least one service analysis stage, and any service analysis stage includes at least one round of operations. An $n^{th}$ round of operations of the service analysis stage include the following steps, where n is greater than or equal to 1: obtaining target data, where the target data are obtained by performing anonymization processing on to-be-processed data, the to-be-processed data include groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget; performing predetermined service analysis on the target data; and if the service analysis succeeds, ending the service analysis stage; or if the service analysis fails, determining an $(n+1)^{th}$ round of privacy budget, and sending the $(n+1)^{th}$ round of privacy budget to the multiple user devices so that each user device re-performs differential privacy processing on respective privacy data in the service analysis stage to perform an $(n+1)^{th}$ round of operations.

Optionally, the determining an $(n+1)^{th}$ round of privacy budget includes the following: determining a candidate privacy budget based on a direction of increasing the $n^{th}$ round of privacy budget; determining whether the candidate privacy budget is available; and determining, if the candidate privacy budget is available, the $(n+1)^{th}$ round of privacy budget based on the candidate privacy budget.

Optionally, the determining whether the candidate privacy budget is available includes the following: determining a sum of privacy budgets for rounds of operations that have been completed in the analysis stage; and determining, based on a result obtained by adding the sum and the candidate privacy budget, whether the candidate privacy budget is available.

Optionally, the differential privacy processing is $\varepsilon,\delta$-local differential privacy processing; the privacy budget includes an $\varepsilon$ local privacy budget and a $\delta$ privacy budget; and the candidate privacy budget includes an $\varepsilon$ candidate global privacy budget and a $\delta$ candidate privacy budget; the determining a candidate privacy budget includes the following: determining the $\varepsilon$ candidate global privacy budget and the $\delta$ candidate privacy budget, so that the $\varepsilon$ candidate global privacy budget is greater than a currently stored $n^{th}$ round of $\varepsilon$ global privacy budget, and the $\delta$ candidate privacy budget is greater than an $n^{th}$ round of $\delta$ privacy budget; the determining whether the candidate privacy budget is available includes the following: determining whether the $\varepsilon$ candidate global privacy budget and the $\delta$ candidate privacy budget are available; and the determining, if the candidate privacy budget is available, the $(n+1)^{th}$ round of privacy budget based on the candidate privacy budget includes the following: if the $\varepsilon$ candidate global privacy budget and the $\delta$ candidate privacy budget are available, determining, based on the $\varepsilon$ candidate global privacy budget and the $\delta$ candidate privacy budget, an $(n+1)^{th}$ round of $\varepsilon$ local privacy budget used for the user device, and storing the $\varepsilon$ candidate global privacy budget as an $(n+1)^{th}$ round of $\varepsilon$ global privacy budget; and using the $\delta$ candidate privacy budget as an $(n+1)^{th}$ round of $\delta$ privacy budget.

Optionally, the determining whether the $\varepsilon$ candidate global privacy budget and the $\delta$ candidate privacy budget are available includes the following: determining a weighted sum of the $\varepsilon$ candidate global privacy budget and $\varepsilon$ global privacy budgets for rounds of operations that have been completed in the analysis stage, and using a result of adding the weighted sum and a predetermined correction term as a first result, where the predetermined correction term is positively correlated with a quadratic sum of the $\varepsilon$ candidate global privacy budget and the $\varepsilon$ global privacy budgets for the rounds of operations that have been completed in the analysis stage; determining, as a second result, a sum of the $\delta$ candidate privacy budget and $\delta$ privacy budgets for the rounds of operations that have been completed in the analysis stage; and if the first result is less than a first predetermined value and the second result is less than a second predetermined value, determining that the $\varepsilon$ candidate global privacy budget and the $\delta$ candidate privacy budget are available.

Optionally, the determining, based on the $\varepsilon$ candidate global privacy budget and the $\delta$ candidate privacy budget, an $(n+1)^{th}$ round of $\varepsilon$ local privacy budget used for the user device includes the following: determining a target coefficient based on the $\delta$ candidate privacy budget, where the target coefficient is positively correlated with the $\delta$ candidate privacy budget, and the target coefficient is positively correlated with a quantity of the multiple user devices; and multiplying the $\varepsilon$ candidate global privacy budget by the target coefficient to obtain the $(n+1)^{th}$ round of $\varepsilon$ local privacy budget.

Optionally, the obtaining target data includes the following: obtaining the to-be-processed data in a trusted execution environment, and performing anonymization processing on the to-be-processed data in the trusted execution environment to obtain the target data.

Optionally, the performing predetermined service analysis on the target data includes the following: performing statistical calculation and analysis on the target data; and/or performing class prediction on the target data.

Optionally, privacy data of any user device include one or more of the following: text data input by the user device; an emoticon input by the user device; information about a link clicked by the user device; information about an application program run on the user device; information about a receipt/payment performed by the user device; information about a web page browsed by the user device; information searched for by the user device; information about an audio/video played by the user device; positioning data of the user device; and information about a product purchased by the user device.

According to a second aspect, a differential privacy-based service analysis apparatus is provided. The apparatus performs at least one service analysis stage, and any service analysis stage includes at least one round of operations; and for an $n^{th}$ round of operations of the service analysis stage, n is greater than or equal to 1, and the apparatus includes the following: an acquisition module, configured to obtain target data, where the target data are obtained by performing anonymization processing on to-be-processed data, the to-be-processed data include groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget; an analysis module, configured to perform predetermined service analysis on the target data; an ending module, configured to, if the service analysis succeeds, end the service analysis stage; a determining module, configured to, if the service analysis fails, determine an $(n+1)^{th}$ round of privacy budget; and a sending module, configured to send the $(n+1)^{th}$ round of privacy budget to the multiple user devices so that each user device re-performs differential privacy processing on respective privacy data in the service analysis stage to perform an $(n+1)^{th}$ round of operations.

Optionally, the determining module includes the following: a first determining sub-module, configured to determine a candidate privacy budget based on a direction of increasing the $n^{th}$ round of privacy budget; a judgment sub-module, configured to determine whether the candidate privacy budget is available; and a second determining sub-module, configured to determine, if the candidate privacy budget is available, the $(n+1)^{th}$ round of privacy budget based on the candidate privacy budget.

Optionally, the judgment sub-module is configured to determine a sum of privacy budgets for rounds of operations that have been completed in the analysis stage; and determine, based on a result obtained by adding the sum and the candidate privacy budget, whether the candidate privacy budget is available.

Optionally, the differential privacy processing is $\varepsilon,\delta$-local differential privacy processing; the privacy budget includes an $\varepsilon$ local privacy budget and a $\delta$ privacy budget; and the candidate privacy budget includes an $\varepsilon$ candidate global privacy budget and a $\delta$ candidate privacy budget; the first determining sub-module is configured to determine the $\varepsilon$ candidate global privacy budget and the $\delta$ candidate privacy budget, so that the $\varepsilon$ candidate global privacy budget is greater than a currently stored $n^{th}$ round of $\varepsilon$ global privacy budget, and the $\delta$ candidate privacy budget is greater than an $n^{th}$ round of $\delta$ privacy budget; the judgment sub-module is configured to determine whether the $\varepsilon$ candidate global privacy budget and the $\delta$ candidate privacy budget are available; and the second determining sub-module is configured to if the $\varepsilon$ candidate global privacy budget and the $\delta$ candidate privacy budget are available, determine, based on the $\varepsilon$ candidate global privacy budget and the $\delta$ candidate privacy budget, an $(n+1)^{th}$ round of $\varepsilon$ local privacy budget used for the user device, and store the $\varepsilon$ candidate global privacy budget as an $(n+1)^{th}$ round of $\varepsilon$ global privacy budget; and use the $\delta$ candidate privacy budget as an $(n+1)^{th}$ round of $\delta$ privacy budget.

Optionally, the judgment sub-module determines, in the following way, whether the $\varepsilon$ candidate global privacy budget and the $\delta$ candidate privacy budget are available: determining a weighted sum of the $\varepsilon$ candidate global privacy budget and $\varepsilon$ global privacy budgets for rounds of operations that have been completed in the analysis stage, and using a result of adding the weighted sum and a predetermined correction term as a first result, where the predetermined correction term is positively correlated with a quadratic sum of the $\varepsilon$ candidate global privacy budget and the $\varepsilon$ global privacy budgets for the rounds of operations that have been completed in the analysis stage; determining, as a second result, a sum of the $\delta$ candidate privacy budget and $\delta$ privacy budgets for the rounds of operations that have been completed in the analysis stage; and if the first result is less than a first predetermined value and the second result is less than a second predetermined value, determining that the $\varepsilon$ candidate global privacy budget and the $\delta$ candidate privacy budget are available.

Optionally, the second determining sub-module determines, in the following way based on the $\varepsilon$ candidate global privacy budget and the $\delta$ candidate privacy budget, an $(n+1)^{th}$ round of $\varepsilon$ local privacy budget used for the user device; determining a target coefficient based on the $\delta$ candidate privacy budget, where the target coefficient is positively correlated with the $\delta$ candidate privacy budget, and the target coefficient is positively correlated with a quantity of the multiple user devices; and multiplying the $\varepsilon$ candidate global privacy budget by the target coefficient to obtain the $(n+1)^{th}$ round of $\varepsilon$ local privacy budget.

Optionally, the acquisition module is configured to obtain the to-be-processed data in a trusted execution environment, and perform anonymization processing on the to-be-processed data in the trusted execution environment to obtain the target data.

Optionally, the analysis module is configured to perform statistical calculation and analysis on the target data; and/or perform class prediction on the target data.

Optionally, privacy data of any user device include one or more of the following: text data input by the user device; an emoticon input by the user device; information about a link clicked by the user device; information about an application program run on the user device; information about a receipt/payment performed by the user device; information about a web page browsed by the user device; information searched for by the user device; information about an audio/video played by the user device; positioning data of the user device; and information about a product purchased by the user device.

According to a third aspect, a computer-readable storage medium is provided. The storage medium stores a computer program, and when executed by a processor, the computer program implements the method according to the first aspect.

According to a fourth aspect, a computing device is provided, including a storage, a processor, and a computer program stored in the storage and executable on the processor. When executing the program, the processor implements the method according to the first aspect.

The technical solutions provided in the embodiments of this specification can include the following beneficial effects: According to the differential privacy-based service analysis methods and apparatuses provided in the embodiments of this specification, the target data is obtained and the predetermined service analysis is performed on the target data. If the service analysis succeeds, the service analysis stage is ended. If the service analysis fails, the $(n+1)^{th}$ round of privacy budget is determined, and the $(n+1)^{th}$ round of privacy budget is sent to the multiple user devices so that each user device re-performs differential privacy processing on the respective privacy data in the service analysis stage to perform the $(n+1)^{th}$ round of operations. As such, in a process of performing differential privacy processing on data, a privacy budget can be adaptively adjusted to enhance flexibility of a privacy protection process and improving availability of privacy protection data.

It should be understood that the previous general description and the following detailed description are merely exemplary and illustrative, and do not limit this specification.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can derive other drawings from these accompanying drawings without creative efforts.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with this specification. Instead, these implementations are merely examples of apparatus and methods consistent with some aspects described in detail in the claims of this specification.

The terms used in this specification are merely used for an objective of describing a specific embodiment, and are not intended to limit this specification. The terms "a", "said", and "the" of singular forms used in this specification and the appended claims are also intended to include plural forms, unless otherwise specified in the context clearly. It should also be understood that the term "and/or" used here refers to and includes any or all possible combinations of one or more associated listed items.

It should be understood that, although the terms "first", "second", "third", and the like may be used this specification to describe various information, the information should not be limited to these terms. These terms are only used to distinguish the same type of information from each other. For example, without departing from the scope of this specification, "first information" may also be referred to as "second information", and similarly, "second information" may also be referred to as "first information". Depending on the context, for example, the term "if" used here can be interpreted as "in a case that . . . ", "when . . . ", or "in response to determining".

Figure 1:
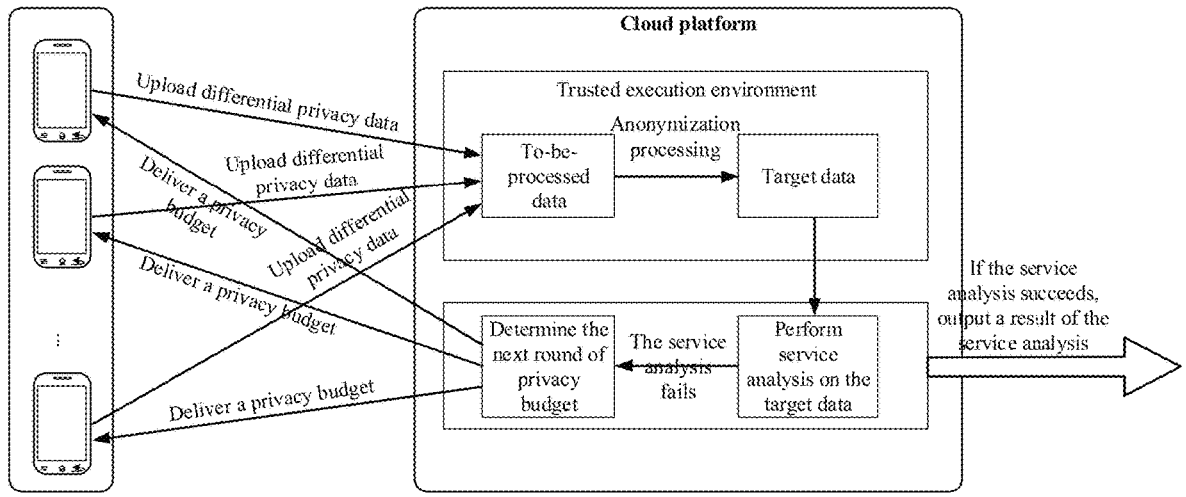
FIG. 1 is a schematic diagram illustrating a differential privacy-based service analysis scenario according to some example embodiments of this specification.

FIG. 1 is a schematic diagram illustrating a differential privacy-based service analysis scenario according to some example embodiments of this specification.

Referring to the scenario shown in FIG. 1, in an $n^{th}$ round of operations in one service analysis stage ($n \geq 1$), multiple user devices separately determine respective privacy data in the service analysis stage. In addition, an $n^{th}$ round of privacy budget in the service analysis stage is obtained, and differential privacy processing is performed on the respective privacy data in the service analysis stage based on the $n^{th}$ round of privacy budget to obtain respective groups of differential privacy data. Then, the user devices respectively upload the groups of differential privacy data to a cloud platform.

The cloud platform receives, in a trusted execution environment, the groups of differential privacy data respectively uploaded by the user devices to obtain to-be-processed data. In addition, anonymization processing is performed on the to-be-processed data in the trusted execution environment to obtain target data.

Then, the cloud platform performs service analysis on the target data. If the service analysis succeeds, the cloud platform can output a result of the service analysis and end the service analysis stage. If the service analysis fails, an $(n+1)^{th}$ round of privacy budget can be further determined, and the $(n+1)^{th}$ round of privacy budget can be sent to the multiple user devices. As such, each user device re-performs differential privacy processing on the respective privacy data in the service analysis stage to perform an $(n+1)^{th}$ round of operations in the service analysis stage, until the service analysis stage is ended.

The following describes in detail the solutions provided in this specification with reference to specific embodiments.

Figure 2:
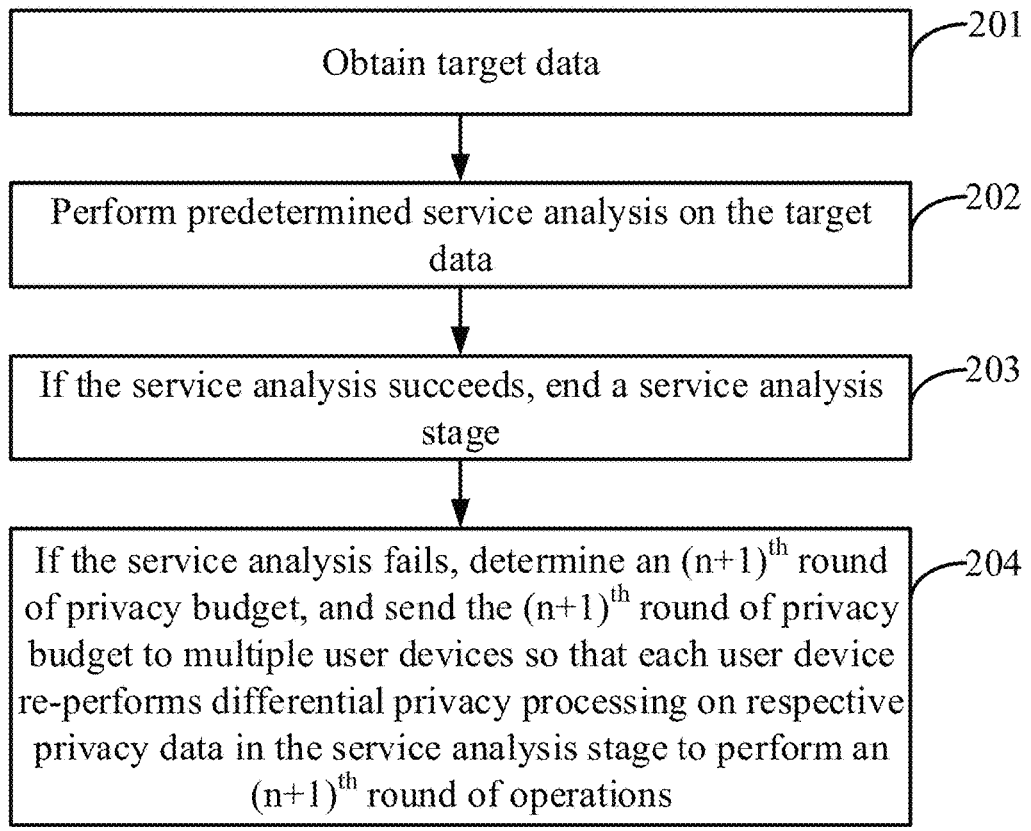
FIG. 2 is a flowchart illustrating a differential privacy-based service analysis method according to some example embodiments of this specification.

FIG. 2 is a flowchart illustrating a differential privacy-based service analysis method according to some example embodiments of this specification. The method can be applied to a cloud platform. The cloud platform can be implemented as any device, platform, server, or device cluster that has computing and processing capabilities. The method can include at least one service analysis stage, and any service analysis stage can include at least one round of operations. An $n^{th}$ round ($n \geq 1$) of operations in the service analysis stage can include the following steps. In step 201, target data is obtained.

In the embodiments, the target data are obtained by performing anonymization processing on to-be-processed data. The to-be-processed data can include groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget.

In an implementation, the cloud platform is deployed with a trusted execution environment, and in the trusted execution environment, the cloud platform receives the groups of differential privacy data that are respectively uploaded by the multiple user devices to obtain to-be-processed data formed by the groups of differential privacy data. In addition, anonymization processing is performed on the to-be-processed data in the trusted execution environment to obtain the target data.

In another implementation, the multiple user devices can respectively upload the groups of differential privacy data to a trusted execution environment of a third-party platform. The third-party platform can perform, in the trusted execution environment, anonymization processing on the to-be-processed data formed by the groups of differential privacy data to obtain the target data, and transmit the target data to the cloud platform.

In the embodiments, anonymization processing can be anonymization processing performed by using a confusion mechanism. Any anonymization processing method that is known in the art and that may emerge in the future can be applied to the embodiments. A specific way of anonymization processing is not limited in the embodiments.

In the embodiments, for each user device, the same privacy data are processed in different rounds in the same service analysis stage. After one service analysis stage is ended, other privacy data is processed in turn in the next service analysis stage.

Privacy data of any user device can include one or more of the following: text data input by the user device; an emoticon input by the user device; information about a link clicked by the user device (for example, an address of the clicked link, a moment of clicking the link, and so on); information about an application program run on the user device (for example, a type of the application program that is run, a moment of running the application program, duration of running the application program, and so on); information about a receipt/payment performed by the user device (for example, a type of the receipt/payment, an amount of the receipt/payment, a moment of the receipt/payment, and so on); information about a web page browsed by the user device (for example, a type of the browsed web page, a moment of browsing the web page, duration of browsing the web page, a keyword/term in the browsed web page, and so on); information searched for by the user device; information about an audio/video played by the user device; positioning data of the user device; and information about a product purchased by the user device. It can be understood that the privacy data can be another type of information, which is not limited in the embodiments.

In step 202, predetermined service analysis is performed on the target data.

In the embodiments, the predetermined service analysis can be performed on the target data. Specifically, statistical calculation and analysis can be performed on the target data; and/or class prediction can be performed on the target data. For example, if the privacy data is the text data input by the user device, the predetermined service analysis can be statistical calculation on term frequencies of some predetermined phrases. For another example, if the privacy data is the information about a receipt/payment and/or the information about a product purchased, the predetermined service analysis can be statistical collection on a consumption level of a consumer group. For another example, if the privacy data is information searched for by a user, the predetermined service analysis can be prediction on a social hot issue. For another example, if the privacy data is the positioning data, the predetermined service analysis can be statistical collection on a crowd distribution and flow.

It can be understood that the predetermined service analysis can further be another type of service analysis, and a specific type of the service analysis is not limited in the embodiments.

In step 203, if the service analysis succeeds, the service analysis stage is ended.

In step 204, if the service analysis fails, an $(n+1)^{th}$ round of privacy budget is determined, and the $(n+1)^{th}$ round of privacy budget is sent to the multiple user devices so that each user device re-performs differential privacy processing on respective privacy data in the service analysis stage to perform an $(n+1)^{th}$ round of operations.

In the embodiments, if the service analysis can reach a result, and the result satisfies a predetermined requirement, it indicates that the service analysis succeeds. If the service analysis cannot reach a result, or can reach a result but the result reached does not satisfy the predetermined requirement, it indicates that the service analysis fails.

In the embodiments, if the above-mentioned service analysis succeeds, the result of the service analysis can be output, and the service analysis stage can be ended. If the service analysis fails, the $(n+1)^{th}$ round of privacy budget can be determined, and the $(n+1)^{th}$ round of privacy budget can be sent to the multiple user devices. Each user device can re-perform differential privacy processing on respective privacy data in the service analysis stage by using the $(n+1)^{th}$ round of privacy budget to perform the $(n+1)^{th}$ round of operations.

In an implementation, an $n^{th}$ round of privacy budget can be increased based on a predetermined rule as the $(n+1)^{th}$ round of privacy budget. For example, assuming that the $n^{th}$ round of privacy budget is $\varepsilon$, the $n^{th}$ round of privacy budget can be increased by a to obtain an $(n+1)^{th}$ round of privacy budget $\varepsilon+a$.

In another implementation, a candidate privacy budget can be further determined based on a direction of increasing the $n^{th}$ round of privacy budget; whether the candidate privacy budget is available can be further determined; and if the candidate privacy budget is available, the $(n+1)^{th}$ round of privacy budget can be further determined based on the candidate privacy budget.

In the embodiments, a Renyi differential privacy method can be used to perform differential privacy processing on the privacy data, or an $(\varepsilon,\delta)$-local differential privacy method can be used to perform differential privacy processing on the privacy data, or a concentrated differential privacy method can be used to perform differential privacy processing on the privacy data. It can be understood that differential privacy processing can be performed on the privacy data by using any method that satisfies a differential privacy protocol. A specific type of differential privacy processing is not limited in the embodiments.

In the embodiments, the involved privacy budget can be $\varepsilon$ in a differential privacy protocol, or $\varepsilon$ and $\delta$ in a differential privacy protocol. It should be noted that if differential privacy processing is performed on the privacy data by using the (ε,δ)-local differential privacy method, the privacy budget sent to the user device is an ε local privacy budget and a δ privacy budget. The ε local privacy budget can be obtained by converting an ε global privacy budget.

According to the differential privacy-based service analysis method provided in the above-mentioned embodiments of this specification, the target data is obtained and the predetermined service analysis is performed on the target data. If the service analysis succeeds, the service analysis stage is ended. If the service analysis fails, the $(n+1)^{th}$ round of privacy budget is determined, and the $(n+1)^{th}$ round of privacy budget is sent to the multiple user devices so that each user device re-performs differential privacy processing on the respective privacy data in the service analysis stage to perform the $(n+1)^{th}$ round of operations. As such, in a process of performing differential privacy processing on data, a privacy budget can be adaptively adjusted to enhance flexibility of a privacy protection process and improving availability of privacy protection data.

Figure 3:
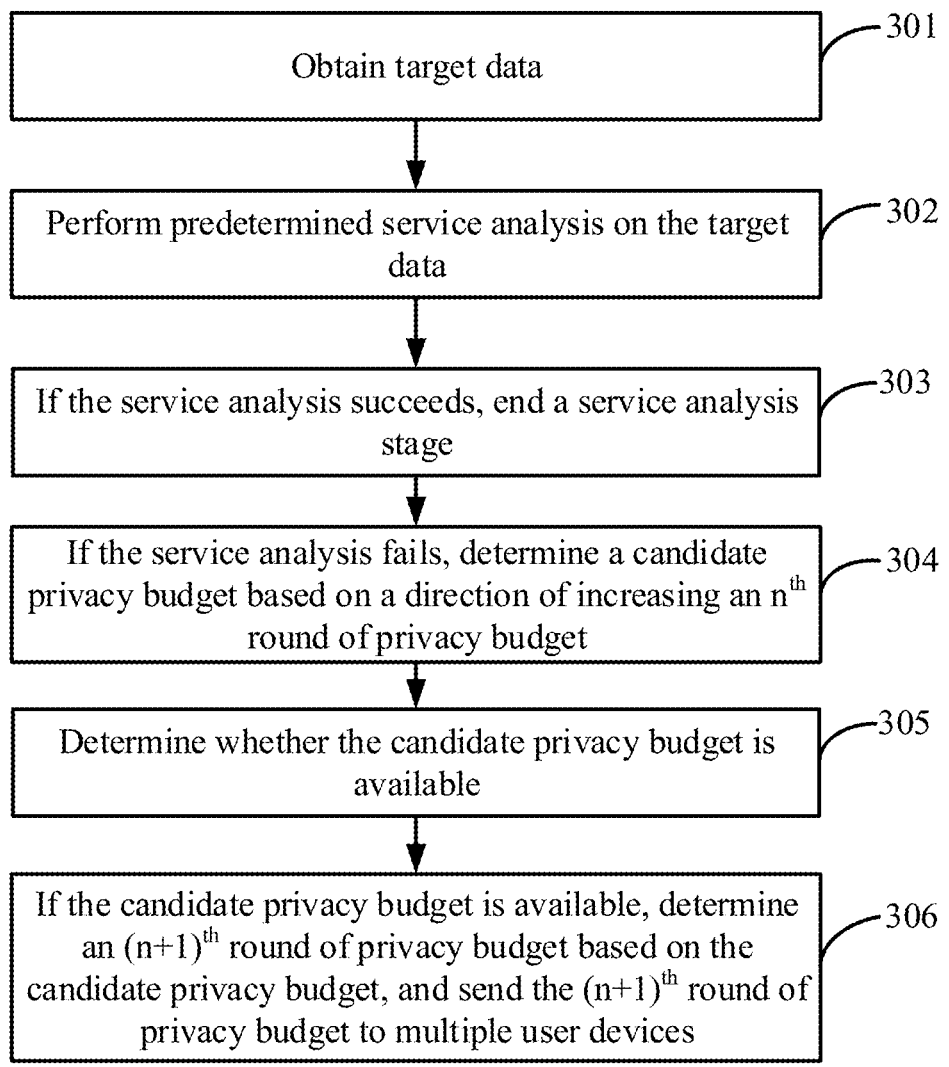
FIG. 3 is a flowchart illustrating another differential privacy-based service analysis method according to some example embodiments of this specification.

FIG. 3 is a flowchart illustrating another differential privacy-based service analysis method according to some example embodiments of this specification. In the embodiments, a process of determining an $(n+1)^{th}$ round of privacy budget is described. The method can be applied to a cloud platform and include the following steps. In step 301, target data is obtained.

In the embodiments, the target data are obtained by performing anonymization processing on to-be-processed data. The to-be-processed data can include groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget.

In step 302, predetermined service analysis is performed on the target data.

In the embodiments, the predetermined service analysis can be performed on the target data. Specifically, statistical calculation and analysis can be performed on the target data; and/or class prediction can be performed on the target data.

In step 303, if the service analysis succeeds, the service analysis stage is ended.

In step 304, if the service analysis fails, a candidate privacy budget is determined based on a direction of increasing the $n^{th}$ round of privacy budget.

In the embodiments, differential privacy processing can be performed on the privacy data by using any method that satisfies a differential privacy protocol. A specific type of differential privacy processing is not limited in the embodiments. The privacy budget can be F in a differential privacy protocol, or ε and δ in a differential privacy protocol. The candidate privacy budget can be determined based on the direction of increasing the $n^{th}$ round of privacy budget.

In step 305, whether the candidate privacy budget is available is determined

In step 306, if the candidate privacy budget is available, an $(n+1)^{th}$ round of privacy budget is determined based on the candidate privacy budget, and the $(n+1)^{th}$ round of privacy budget is sent to the multiple user devices.

In the embodiments, if the candidate privacy budget is unavailable, the candidate privacy budget can be appropriately reduced, and then whether the candidate privacy budget is available continues to be determined. Or, the service analysis stage can be directly ended. If the candidate privacy budget is available, the $(n+1)^{th}$ round of privacy budget can be determined based on the candidate privacy budget, and the $(n+1)^{th}$ round of privacy budget can be sent to the multiple user devices.

Specifically, the candidate privacy budget can be determined in any reasonable way to determine whether the candidate privacy budget is available. When the candidate privacy budget is available, the $(n+1)^{th}$ round of privacy budget can be determined based on the candidate privacy budget. An example is as follows: In an implementation, if differential privacy processing is performed on the privacy data by using some methods other than (ε, δ)-local differential privacy, the privacy budget sent to the user device includes an ε privacy budget, and the candidate privacy budget includes an ε candidate privacy budget. The ε candidate privacy budget can be determined based on a direction of increasing an $n^{th}$ round of ε privacy budget. For example, if the $n^{th}$ round of ε privacy budget is $\varepsilon_n$, the candidate privacy budget can be determined as $\varepsilon_n+\Delta_\varepsilon$, where $\Delta_\varepsilon>0$.

Then, a sum of ε privacy budgets for rounds of operations that have been completed in the analysis stage can be determined; and based on a result obtained by adding the sum and the ε candidate privacy budget, whether the candidate privacy budget ε is available can be determined. For example, if the result obtained by adding the sum and the ε candidate privacy budget is less than a predetermined threshold, it is determined that the ε candidate privacy budget is available. If the result obtained by adding the sum and the ε candidate privacy budget is greater than or equal to the predetermined threshold, it is determined that the ε candidate privacy budget is unavailable.

Finally, if the ε candidate privacy budget is available, the ε candidate privacy budget can be used as an $(n+1)^{th}$ round of ε privacy budget, and the $(n+1)^{th}$ round of ε privacy budget can be sent to the multiple user devices. For example, the $n^{th}$ round of ε privacy budget is $\varepsilon_n$, and the candidate privacy budget is $\varepsilon_n+\Delta_\varepsilon$. $\varepsilon_n+\Delta_\varepsilon$ can be used as the $(n+1)^{th}$ round of privacy budget as follows:

$$\varepsilon_{n+1}=\varepsilon_n+\Delta_\varepsilon$$

In another implementation, if differential privacy processing is performed on the privacy data by using some other methods other than (ε, δ)-local differential privacy, the privacy budget sent to the user device includes an ε privacy budget and a δ privacy budget, and the candidate privacy budget includes an ε candidate privacy budget and a δ candidate privacy budget. The ε candidate privacy budget can be determined based on a direction of increasing an $n^{th}$ round of ε privacy budget, and the δ candidate privacy budget can be determined based on a direction of increasing an $n^{th}$ round of δ privacy budget. For example, the $n^{th}$ round of privacy budget is $\varepsilon_n$ and $\delta_n$, and the candidate privacy budget can be determined as $\varepsilon_n+\Delta_\varepsilon$ and $\delta_n+\Delta_\delta$, where $\Delta_\varepsilon>0$ and $\Delta_\delta>0$.

Then, a first sum of adding the ε candidate privacy budget and ε privacy budgets for rounds of operations that have been completed in the analysis stage can be determined, a second sum of adding the δ candidate privacy budget and δ privacy budgets for the rounds of operations that have been completed in the analysis stage can be determined, and whether the ε candidate privacy budget is available can be determined based on the first sum and the second sum. For example, if the first sum is less than a first predetermined threshold and the second sum is less than a second predetermined threshold, it can be determined that the ε candidate privacy budget and the δ candidate privacy budget are available. If the first sum is greater than or equal to the first predetermined threshold, or the second sum is greater than or equal to the second predetermined threshold, it can be determined that the ε candidate privacy budget and the δ candidate privacy budget are unavailable.

Finally, if the ε candidate privacy budget and the δ candidate privacy budget are available, the ε candidate privacy budget can be used as an $(n+1)^{th}$ round of ε privacy budget, and the δ candidate privacy budget can be used as an $(n+1)^{th}$ round of δ privacy budget. For example, if the $n^{th}$ round of privacy budget is $\varepsilon_n$ and $\delta_n$, and the candidate privacy budget is $\varepsilon_n+\Delta_\varepsilon$ and $\delta_n+\Delta_\delta$. $\varepsilon_n+\Delta_\varepsilon$ and $\delta_n+\Delta_\delta$ can be used as the $(n+1)^{th}$ round of privacy budget as follows:

$$\varepsilon_{n+1}=\varepsilon_n+\Delta_\varepsilon;\text{ and}$$

$$\delta_{n+1}=\delta_n\Delta_\delta.$$

In still another implementation, if differential privacy processing is performed on the privacy data by using an (ε, δ)-local differential privacy method, the privacy budget sent to the user device includes an ε local privacy budget and a δ privacy budget, and the candidate privacy budget includes an ε candidate global privacy budget and a δ candidate privacy budget. The ε local privacy budget can be obtained by converting an ε global privacy budget, and the ε local privacy budget is positively correlated with the ε global privacy budget. Therefore, the ε candidate global privacy budget can be determined based on a direction of increasing an $n^{th}$ round of ε global privacy budget (that is, a direction of increasing an $n^{th}$ round of ε local privacy budget). In addition, the δ candidate privacy budget is determined based on a direction of increasing an $n^{th}$ round of δ privacy budget. For example, the $n^{th}$ round of privacy budget is $\varepsilon_n$ and $\delta_n$, where $\varepsilon_0$ is the ε local privacy budget, and $\varepsilon_n'$ is assumed to be the $n^{th}$ round of ε global privacy budget and satisfies the following: $\varepsilon_n'=f(\varepsilon_n)$. The candidate privacy budget can include the ε candidate global privacy budget and the δ candidate privacy budget. In this case, the candidate privacy budget can be determined as $f(\varepsilon_n)+\Delta_\varepsilon$ and $\delta+\Delta_\delta$, where $\Delta_\varepsilon>0$, and $\Delta_\delta>0$.

Then, in one aspect, a sum of ε global privacy budgets for rounds of operations that have been completed in the analysis stage can be determined, and a first summation result obtained by adding the ε candidate global privacy budget and the sum of the ε global privacy budgets can be determined. In another aspect, a sum of δ privacy budgets for the rounds of operations that have been completed in the analysis stage can be determined, and a second summation result obtained by adding the δ candidate privacy budget and the sum of the δ privacy budgets can be determined. Then, whether the ε candidate global privacy budget and the δ candidate privacy budget are available is determined based on the first summation result and the second summation result. For example, if the first summation result is less than a first predetermined threshold and the second summation result is less than a second predetermined threshold, it can be determined that the ε candidate global privacy budget and the δ candidate privacy budget are available. If the first summation result is greater than or equal to the first predetermined threshold, or the second summation result is greater than or equal to the second predetermined threshold, it can be determined that the ε candidate global privacy budget and the δ candidate privacy budget are unavailable.

Finally, in one aspect, an $(n+1)^{th}$ round of ε local privacy budget used for the user device can be determined based on the ε candidate global privacy budget and the δ candidate privacy budget. In another aspect, the δ candidate privacy budget can be used as an $(n+1)^{th}$ round of δ privacy budget.

It should be noted that, for a step same as the step in the embodiments in FIG. 2, details are omitted for brevity in the embodiments in FIG. 3. For related content, reference can be made to the embodiments in FIG. 2.

According to the differential privacy-based service analysis method provided in the above-mentioned embodiments of this specification, the target data is obtained and the predetermined service analysis is performed on the target data. If the service analysis succeeds, the service analysis stage is ended. If the service analysis fails, the candidate privacy budget is determined based on the direction of increasing the $n^{th}$ round of privacy budget, and whether the candidate privacy budget is available is determined. If the candidate privacy budget is available, the $(n+1)^{th}$ round of privacy budget is determined based on the candidate privacy budget, and the $(n+1)^{th}$ round of privacy budget is sent to the multiple user devices. As such, in a process of performing differential privacy processing on data, a privacy budget can be adaptively adjusted while ensuring a relatively high privacy protection level so as to enhance flexibility of a privacy protection process and helping improve availability of privacy protection data.

Figure 4:
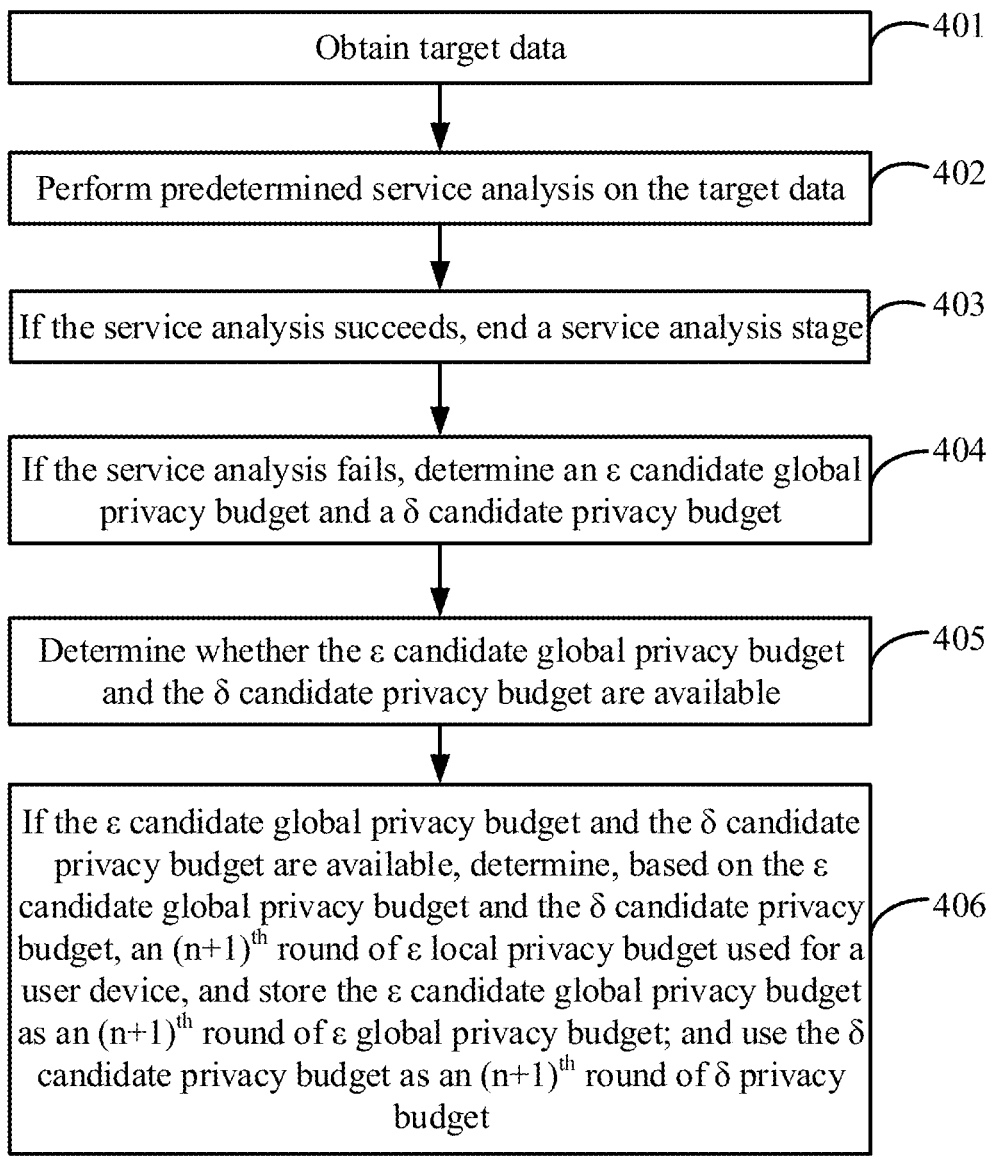
FIG. 4 is a flowchart illustrating another differential privacy-based service analysis method according to some example embodiments of this specification.

FIG. 4 is a flowchart illustrating another differential privacy-based service analysis method according to some example embodiments of this specification. In the embodiments, a process of ε,δ-local differential privacy processing is described. The method can be applied to a cloud platform and include the following steps. In step 401, target data is obtained.

In the embodiments, the target data are obtained by performing anonymization processing on to-be-processed data. The to-be-processed data can include groups of differential privacy data that are respectively uploaded by multiple user devices, and any group of differential privacy data are obtained by a corresponding user device by performing local differential privacy processing on privacy data of the user device in the service analysis stage by using an $n^{th}$ round of ε local privacy budget and an $n^{th}$ round of δ privacy budget.

In step 402, predetermined service analysis is performed on the target data.

In the embodiments, the predetermined service analysis can be performed on the target data. Specifically, statistical calculation and analysis can be performed on the target data; and/or class prediction can be performed on the target data.

In step 403, if the service analysis succeeds, the service analysis stage is ended.

In step 404, if the service analysis fails, an ε candidate global privacy budget and a S candidate privacy budget are determined.

In the embodiments, if the service analysis fails, the ε candidate global privacy budget and the δ candidate privacy budget can be determined, so that the ε candidate global privacy budget is greater than a currently stored $n^{th}$ round of ε global privacy budget, and the δ candidate privacy budget is greater than an $n^{th}$ round of δ privacy budget;

In step 405, whether the ε candidate global privacy budget and the δ candidate privacy budget are available is determined In an implementation, a sum of ε global privacy budgets for rounds of operations that have been completed in the analysis stage can be determined, and a first summation result obtained by adding the ε candidate global privacy budget and the sum of the ε global privacy budgets can be determined. In addition, a sum of δ privacy budgets for the rounds of operations that have been completed in the analysis stage can be determined, and a second summation result obtained by adding the δ candidate privacy budget and the sum of the δ privacy budgets can be determined. Then, whether the ε candidate global privacy budget and the δ candidate privacy budget are available is determined based on the first summation result and the second summation result. For example, if the first summation result is less than a first predetermined threshold and the second summation result is less than a second predetermined threshold, it can be determined that the ε candidate global privacy budget and the δ candidate privacy budget are available. If the first summation result is greater than or equal to the first predetermined threshold, or the second summation result is greater than or equal to the second predetermined threshold, it can be determined that the ε candidate global privacy budget and the δ candidate privacy budget are unavailable.

In another implementation, a weighted sum of the ε candidate global privacy budget and ε global privacy budgets for rounds of operations that have been completed in the analysis stage can be further determined, and a result of adding the weighted sum and a predetermined correction term can be further used as a first result. The predetermined correction term is positively correlated with a quadratic sum of the ε candidate global privacy budget and the ε global privacy budgets for the rounds of operations that have been completed in the analysis stage. A sum of the δ candidate privacy budget and δ privacy budgets for the rounds of operations that have been completed in the analysis stage is determined as a second result. If the first result is less than a first predetermined value and the second result is less than a second predetermined value, it is determined that the ε candidate global privacy budget and the δ candidate privacy budget are available. If the first result is greater than or equal to the first predetermined value, or the second result is greater than or equal to the second predetermined value, it is determined that the ε candidate global privacy budget and the δ candidate privacy budget are unavailable.

It can be understood that, whether the ε candidate global privacy budget and the S candidate privacy budget are available can be further determined in any other reasonable way. A specific way of determining whether the ε candidate global privacy budget and the δ candidate privacy budget are available is not limited in the embodiments.

In step 406, if the ε candidate global privacy budget and the δ candidate privacy budget are available, an $(n+1)^{th}$ round of ε local privacy budget used for the user device is determined based on the ε candidate global privacy budget and the δ candidate privacy budget, and the ε candidate global privacy budget is stored as an $(n+1)^{th}$ round of ε global privacy budget; and the δ candidate privacy budget is used as an $(n+1)^{th}$ round of δ privacy budget.

In the embodiments, if the ε candidate global privacy budget and the δ candidate privacy budget are available, the δ candidate privacy budget can be used as the $(n+1)^{th}$ round of δ privacy budget. In addition, the $(n+1)^{th}$ round of ε local privacy budget used for the user device can be determined based on the ε candidate global privacy budget and the δ candidate privacy budget. Specifically, a target coefficient can be determined based on the δ candidate privacy budget. The target coefficient is positively correlated with the δ candidate privacy budget, and is positively correlated with a quantity of the multiple user devices. Then, the ε candidate global privacy budget is multiplied by the target coefficient to obtain the $(n+1)^{th}$ round of ε local privacy budget used for the user device.

For example, the $(n+1)^{th}$ round of ε local privacy budget used for the user device can be determined by using the following equation:

$$\varepsilon_1 = \frac{\varepsilon_2}{12\sqrt{\frac{\ln\frac{1}{\Delta}}{m}}},$$

where $\varepsilon_1$ represents the $(n+1)^{th}$ round of ε local privacy budget, $\varepsilon_2$ represents the ε candidate global privacy budget, A represents the δ candidate privacy budget, and m represents the quantity of the user devices. It can be understood that a specific way of determining the $(n+1)^{th}$ round of ε local privacy budget used for the user device is not limited to the above-mentioned equation, and any other reasonable variation (for example, 12 in the above-mentioned equation can alternatively be another value determined based on experience, and m in the above-mentioned equation can alternatively be a constant of the same order of magnitude as the quantity of the user devices, etc.) on the above-mentioned equation can be applicable to the embodiments. A specific way of determining the $(n+1)^{th}$ round of ε local privacy budget is not limited in the embodiments.

In the embodiments, the ε candidate global privacy budget can be stored as the $(n+1)^{th}$ round of ε global privacy budget, so that it can be used to determine an $(n+1)^{th}$ round of candidate privacy budget.

It should be noted that, for a step same as the step in the embodiments in FIG. 2 and FIG. 3, details are omitted for brevity in the embodiments in FIG. 4. For related content, reference can be made to the embodiments in FIG. 2 and FIG. 3.

According to the differential privacy-based service analysis method provided in the above-mentioned embodiments of this specification, the target data is obtained and the predetermined service analysis is performed on the target data. If the service analysis succeeds, the service analysis stage is ended. If the service analysis fails, the ε candidate global privacy budget and the δ candidate privacy budget are determined. Whether the ε candidate global privacy budget and the δ candidate privacy budget are available is determined. If the ε candidate global privacy budget and the S candidate privacy budget are available, the $(n+1)^{th}$ round of ε local privacy budget used for the user device is determined based on the ε candidate global privacy budget and the δ candidate privacy budget, and the ε candidate global privacy budget is stored as the $(n+1)^{th}$ round of ε global privacy budget; and the δ candidate privacy budget is used as the $(n+1)^{th}$ round of δ privacy budget. As such, in a process of performing differential privacy processing on data, a privacy budget can be adaptively adjusted to further enhance flexibility of a privacy protection process and helping improve availability of privacy protection data.

It should be noted that, although the operations of the methods in the embodiments of this specification are described in a particular order in the above-mentioned embodiments, it is not required or implied that these operations must be performed in the particular order or that all the operations illustrated must be performed to achieve desired results. In contrast, an execution order of the steps depicted in the flowcharts can be changed. Additionally or alternatively, some steps can be omitted, multiple steps can be combined into one step for execution, and/or one step can be broken down into multiple steps for execution.

Corresponding to the above-mentioned embodiments of the differential privacy-based service analysis methods, this specification further provides some embodiments of differential privacy-based service analysis apparatuses.

Figure 5:
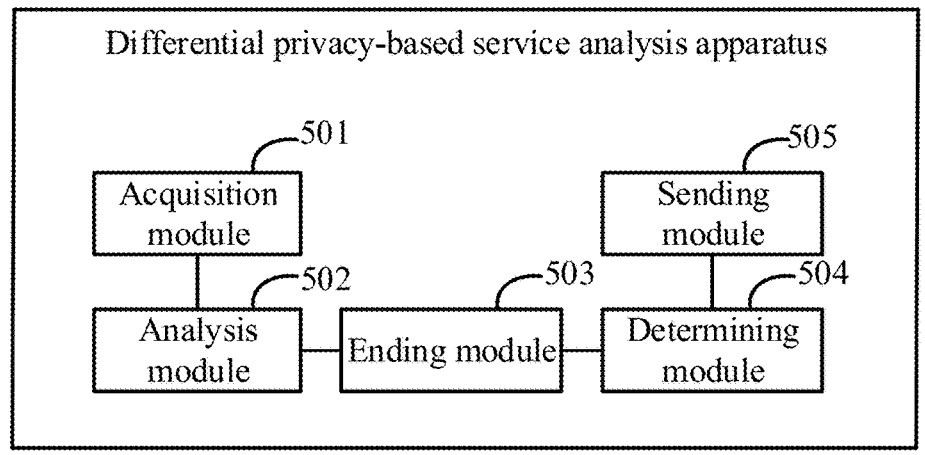
FIG. 5 is a block diagram illustrating a differential privacy-based service analysis apparatus according to some example embodiments of this specification.

FIG. 5 is a block diagram illustrating a differential privacy-based service analysis apparatus according to some example embodiments of this specification. The apparatus performs at least one service analysis stage, and any service analysis stage includes at least one round of operations. For an $n^{th}$ round of operations in the service analysis stage, n is greater than or equal to 1. The apparatus can include an acquisition module 501, an analysis module 502, an ending module 503, a determining module 504, and a sending module 505.

The acquisition module 501 is configured to obtain target data, where the target data are obtained by performing anonymization processing on to-be-processed data. The to-be-processed data include groups of differential privacy data that are respectively uploaded by multiple user devices. Any group of differential privacy data are obtained by a corresponding user device by performing differential privacy processing on privacy data of the user device in the service analysis stage by using an $n^{th}$ round of privacy budget.

The analysis module 502 is configured to perform predetermined service analysis on the target data.

The ending module 503 is configured to, if the service analysis succeeds, end the service analysis stage.

The determining module 504 is configured to, if the service analysis fails, determine an $(n+1)^{th}$ round of privacy budget.

The sending module 505 is configured to send the $(n+1)^{th}$ round of privacy budget to the multiple user devices so that each user device re-performs differential privacy processing on respective privacy data in the service analysis stage to perform an $(n+1)^{th}$ round of operations.

In some implementations, the determining module 504 can include a first determining sub-module, a judgment sub-module, and a second determining sub-module (not shown in the figure).

The first determining sub-module is configured to determine a candidate privacy budget based on a direction of increasing the $n^{th}$ round of privacy budget.

The judgment sub-module is configured to determine whether the candidate privacy budget is available.

The second determining sub-module is configured to determine, if the candidate privacy budget is available, the $(n+1)^{th}$ round of privacy budget based on the candidate privacy budget.

In some other implementations, the judgment sub-module is configured to determine a sum of privacy budgets for rounds of operations that have been completed in the analysis stage; and determine, based on a result obtained by adding the sum and the candidate privacy budget, whether the candidate privacy budget is available.

In some other implementations, the differential privacy processing is ε,δ-local differential privacy processing; the privacy budget includes an ε local privacy budget and a δ privacy budget; and the candidate privacy budget includes an ε candidate global privacy budget and a δ candidate privacy budget.

The first determining sub-module is configured to determine the ε candidate global privacy budget and the δ candidate privacy budget, so that the ε candidate global privacy budget is greater than a currently stored $n^{th}$ round of ε global privacy budget, and the δ candidate privacy budget is greater than an $n^{th}$ round of δ privacy budget.

The judgment sub-module is configured to determine whether the ε candidate global privacy budget and the δ candidate privacy budget are available.

The second determining sub-module is configured to, if the ε candidate global privacy budget and the δ candidate privacy budget are available, determine, based on the ε candidate global privacy budget and the δ candidate privacy budget, an $(n+1)^{th}$ round of ε local privacy budget used for the user device, and store the ε candidate global privacy budget as an $(n+1)^{th}$ round of ε global privacy budget; and use the δ candidate privacy budget as an $(n+1)^{th}$ round of δ privacy budget.

In some other implementations, the judgment sub-module can determine, in the following way, whether the ε candidate global privacy budget and the δ candidate privacy budget are available: determining a weighted sum of the ε candidate global privacy budget and ε global privacy budgets for rounds of operations that have been completed in the analysis stage, and using a result of adding the weighted sum and a predetermined correction term as a first result. The predetermined correction term is positively correlated with a quadratic sum of the ε candidate global privacy budget and the F global privacy budgets for the rounds of operations that have been completed in the analysis stage. The judgment sub-module can determine, as a second result, a sum of the δ candidate privacy budget and δ privacy budgets for the rounds of operations that have been completed in the analysis stage. If the first result is less than a first predetermined value and the second result is less than a second predetermined value, the judgment sub-module can determine that the ε candidate global privacy budget and the δ candidate privacy budget are available.

In some other implementations, the second determining sub-module can determine, in the following way based on the ε candidate global privacy budget and the δ candidate privacy budget, an $(n+1)^{th}$ round of ε local privacy budget used for the user device: determining a target coefficient based on the δ candidate privacy budget, where the target coefficient is positively correlated with the S candidate privacy budget, and the target coefficient is positively correlated with a quantity of the multiple user devices. The second determining sub-module can multiply the ε candidate global privacy budget by the target coefficient to obtain the $(n+1)^{th}$ round of ε local privacy budget.

In some other implementations, the acquisition module 501 is configured to obtain the to-be-processed data in a trusted execution environment, and perform anonymization processing on the to-be-processed data in the trusted execution environment to obtain the target data.

In some other implementations, the analysis module 502 is configured to perform statistical calculation and analysis on the target data; and/or perform class prediction on the target data.

In some other implementations, privacy data of any user device can include one or more of the following: text data input by the user device; an emoticon input by the user device; information about a link clicked by the user device; information about an application program run on the user device; information about a receipt/payment performed by the user device; information about a web page browsed by the user device; information searched for by the user device; information about an audio/video played by the user device; positioning data of the user device; and information about a product purchased by the user device.

It should be understood that the above-mentioned apparatus can be disposed in a computing device on a cloud platform in advance, or can be loaded into a computing device on a cloud platform by download or the like. Corresponding modules in the above-mentioned apparatus can cooperate with modules in the computing device on the cloud platform to implement differential privacy-based service analysis solutions.

The apparatus embodiments basically correspond to the method embodiments. Therefore, for related parts, reference can be made to partial descriptions in the method embodiments. The described apparatus embodiments are merely illustrative. The units described as separate parts may or may not be physically separated, and parts displayed as units may or may not be physical units, that is, may be located in a same place or may be distributed to multiple network units. Some or all of the modules may be selected based on actual needs to implement the objectives of the solutions of one or more embodiments of this specification. A person of ordinary skill in the art can understand and implement the solutions without creative efforts.

One or more embodiments of this specification further provide a computer-readable storage medium. The storage medium stores a computer program, and the computer program can be configured to perform the above-mentioned differential privacy-based service analysis method provided in any one of the embodiments in FIG. 2 to FIG. 4.

Figure 6:
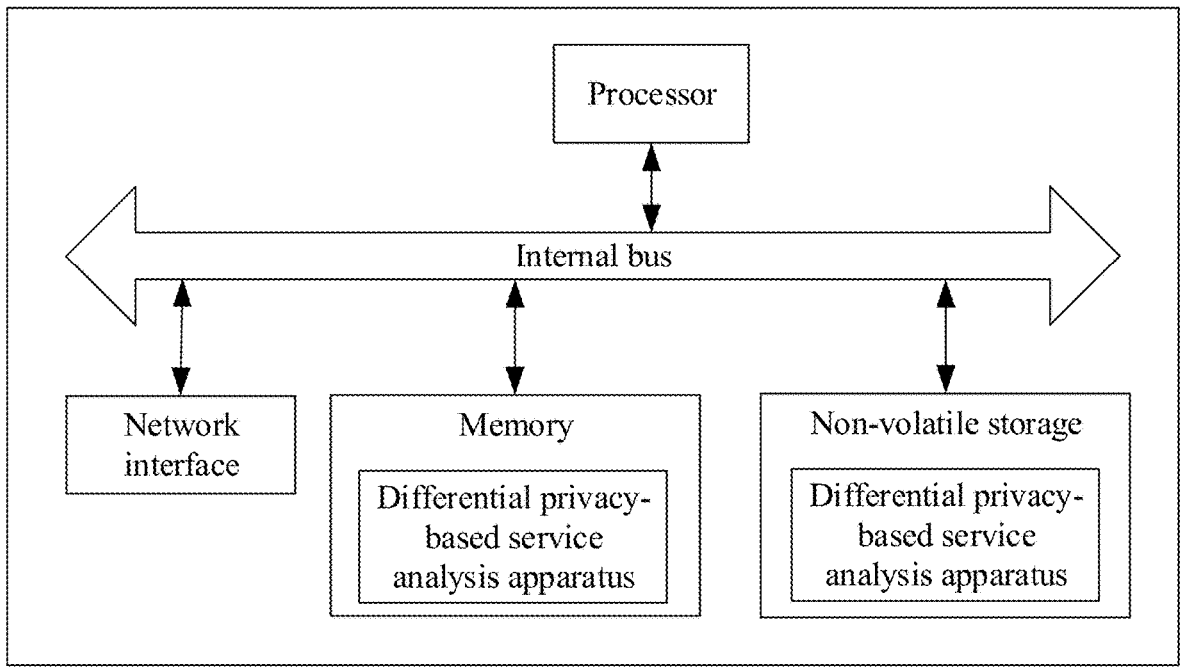
FIG. 6 is a schematic diagram illustrating a structure of a computing device according to some example embodiments of this specification.

Corresponding to the above-mentioned differential privacy-based service analysis method, one or more embodiments of this specification further propose a schematic diagram shown in FIG. 6 illustrating a structure of a computing device according to some example embodiments of this specification. As shown in FIG. 6, at a hardware level, the computing device includes a processor, an internal bus, a network interface, a memory, and a non-volatile storage, and certainly can further include hardware needed by another service. The processor reads a corresponding computer program from the non-volatile storage to the memory and runs the computer program, so as to logically form the differential privacy-based service analysis apparatus. Certainly, in addition to a software implementation, one or more embodiments of this specification do not rule out other implementations, such as an implementation of a logic device or a combination of software and hardware. In other words, an execution body of the following processing procedure is not limited to each logical unit, and can be hardware or a logic device.

The embodiments in this specification are described in a progressive way. For same or similar parts of the embodiments, reference can be made to the embodiments mutually. Each embodiment focuses on a difference from other embodiments. Particularly, a system embodiment is similar to a method embodiment, and therefore is described briefly. For related parts, reference can be made to partial descriptions in the method embodiment.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular order or consecutive order to achieve the desired results. In some implementations, multi-tasking and parallel processing are feasible or may be advantageous.

A person of ordinary skill in the art should further realize that, example units and algorithm steps described with reference to the embodiments disclosed in this specification can be implemented by electronic hardware, computer software, or a combination thereof. To clearly describe interchangeability between hardware and software, the above-mentioned description generally describes composition and steps of each example based on functions. Whether a function is executed by hardware or software depends on a specific application and design constraint condition of a technical solution. A person of ordinary skill in the art can use different methods for each specific application to implement the described functions, but this implementation should not be considered as beyond the scope of this specification. Software modules can be disposed in a random access memory (RAM), a memory, a read-only memory (ROM), an electrically programmable ROM, an electrically erasable programmable ROM, a register, a hard disk, a removable magnetic disk, a CD-ROM, or any other form of storage medium known in the art.

The above-mentioned specific implementations further explain the objectives, technical solutions, and beneficial effects of this specification in detail. It should be understood that the above-mentioned descriptions are merely specific implementations of this specification, and are not intended to limit this specification. Any modification, equivalent replacement, improvement, etc. made within the spirit and principles of this specification should fall within the protection scope of this specification.

What is claimed is:

1. A differential privacy-based service analysis method, wherein the method comprises at least one service analysis stage, and any service analysis stage comprises at least one round of operations; and an $n^{th}$ round of operations of the service analysis stage comprise the following steps, wherein n is greater than or equal to 1:

obtaining target data, wherein the target data are obtained by performing anonymization processing on to-be-processed data, the to-be-processed data comprise groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget;

performing predetermined service analysis on the target data; and if the service analysis succeeds, ending the service analysis stage; or if the service analysis fails, determining an $(n+1)^{th}$ round of privacy budget, and sending the $(n+1)^{th}$ round of privacy budget to the multiple user devices so that each user device re-performs differential privacy processing on respective privacy data in the service analysis stage to perform an $(n+1)^{th}$ round of operations.

2. The method according to claim 1, wherein the determining an $(n+1)^{th}$ round of privacy budget comprises the following:

determining a candidate privacy budget based on a direction of increasing the $n^{th}$ round of privacy budget;

determining whether the candidate privacy budget is available; and determining, if the candidate privacy budget is available, the $(n+1)^{th}$ round of privacy budget based on the candidate privacy budget.

3. The method according to claim 2, wherein the determining whether the candidate privacy budget is available comprises the following:

determining a sum of privacy budgets for rounds of operations that have been completed in the analysis stage; and determining, based on a result obtained by adding the sum and the candidate privacy budget, whether the candidate privacy budget is available.

4. The method according to claim 2, wherein the differential privacy processing is $\varepsilon,\delta$-local differential privacy processing; the privacy budget comprises an $\varepsilon$ local privacy budget and a $\delta$ privacy budget; and the candidate privacy budget comprises an $\varepsilon$ candidate global privacy budget and a $\varepsilon$ candidate privacy budget;

the determining a candidate privacy budget comprises the following:

determining the $\varepsilon$ candidate global privacy budget and the $\delta$ candidate privacy budget, so that the $\varepsilon$ candidate global privacy budget is greater than a currently stored $n^{th}$ round of $\varepsilon$ global privacy budget, and the $\delta$ candidate privacy budget is greater than an $n^{th}$ round of $\delta$ privacy budget;

the determining whether the candidate privacy budget is available comprises the following:

determining whether the $\varepsilon$ candidate global privacy budget and the $\varepsilon$ candidate privacy budget are available; and the determining, if the candidate privacy budget is available, the $(n+1)^{th}$ round of privacy budget based on the candidate privacy budget comprises the following:

if the $\varepsilon$ candidate global privacy budget and the $\varepsilon$ candidate privacy budget are available, determining, based on the $\varepsilon$ candidate global privacy budget and the $\varepsilon$ candidate privacy budget, an $(n+1)^{th}$ round of $\varepsilon$ local privacy budget used for the user device, and storing the $\varepsilon$ candidate global privacy budget as an $(n+1)^{th}$ round of $\varepsilon$ global privacy budget; and using the $\varepsilon$ candidate privacy budget as an $(n+1)^{th}$ round of $\varepsilon$ privacy budget.

5. The method according to claim 4, wherein the determining whether the $\varepsilon$ candidate global privacy budget and the $\delta$ candidate privacy budget are available comprises the following:

determining a weighted sum of the $\varepsilon$ candidate global privacy budget and $\varepsilon$ global privacy budgets for rounds of operations that have been completed in the analysis stage, and using a result of adding the weighted sum and a predetermined correction term as a first result, wherein the predetermined correction term is positively correlated with a quadratic sum of the $\varepsilon$ candidate global privacy budget and the $\varepsilon$ global privacy budgets for the rounds of operations that have been completed in the analysis stage;

determining, as a second result, a sum of the $\delta$ candidate privacy budget and $\delta$ privacy budgets for the rounds of operations that have been completed in the analysis stage; and if the first result is less than a first predetermined value and the second result is less than a second predetermined value, determining that the $\varepsilon$ candidate global privacy budget and the $\delta$ candidate privacy budget are available.

6. The method according to claim 4, wherein the determining, based on the $\varepsilon$ candidate global privacy budget and the $\delta$ candidate privacy budget, an $(n+1)^{th}$ round of $\varepsilon$ local privacy budget used for the user device comprises the following:

determining a target coefficient based on the $\delta$ candidate privacy budget, wherein the target coefficient is positively correlated with the $\delta$ candidate privacy budget, and the target coefficient is positively correlated with a quantity of the multiple user devices; and multiplying the $\varepsilon$ candidate global privacy budget by the target coefficient to obtain the $(n+1)^{th}$ round of $\varepsilon$ local privacy budget.

7. The method according to claim 1, wherein the obtaining target data comprises the following:

obtaining the to-be-processed data in a trusted execution environment, and performing anonymization processing on the to-be-processed data in the trusted execution environment to obtain the target data.

8. The method according to claim 1, wherein the performing predetermined service analysis on the target data comprises the following:

performing statistical calculation and analysis on the target data; and/or performing class prediction on the target data.

9. The method according to claim 1, wherein privacy data of any user device comprise one or more of the following:

text data input by the user device;

an emoticon input by the user device;

information about a link clicked by the user device;

information about an application program run on the user device;

information about a receipt/payment performed by the user device;

information about a web page browsed by the user device;

information searched for by the user device;

information about an audio/video played by the user device;

positioning data of the user device; and information about a product purchased by the user device.

10. A non-transitory computer-readable storage medium having stored therein a computer program that, when executed by a processor of a computing device, cause the computing device to:

obtain target data, wherein the target data are obtained by performing anonymization processing on to-be-processed data, the to-be-processed data comprise groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget, wherein n is greater than or equal to 1;

perform predetermined service analysis on the target data; and if the service analysis succeeds, end the service analysis stage; or if the service analysis fails, determine an $(n+1)^{th}$ round of privacy budget, and send the $(n+1)^{th}$ round of privacy budget to the multiple user devices so that each user device re-performs differential privacy processing on respective privacy data in the service analysis stage to perform an $(n+1)^{th}$ round of operations.

11. A computing device, comprising a memory and a processor, wherein the memory stores a computer program that, in response to execution by the processor, cause the computing device to:

obtain target data, wherein the target data are obtained by performing anonymization processing on to-be-processed data, the to-be-processed data comprise groups of differential privacy data that are respectively uploaded by multiple user devices, and any group of differential privacy data are obtained by a corresponding user device by performing differential privacy processing on privacy data of the user device in the service analysis stage by using an $n^{th}$ round of privacy budget, wherein n is greater than or equal to 1;

perform predetermined service analysis on the target data; and if the service analysis succeeds, end the service analysis stage; or if the service analysis fails, determine an $(n+1)^{th}$ round of privacy budget, and send the $(n+1)^{th}$ round of privacy budget to the multiple user devices so that each user device re-performs differential privacy processing on respective privacy data in the service analysis stage to perform an $(n+1)^{th}$ round of operations.

\* \* \* \* \*